Aug. 12, 1952  C. G. RICHARDSON  2,606,355
ROTARY SHEARING MEMBER
Filed March 7, 1951
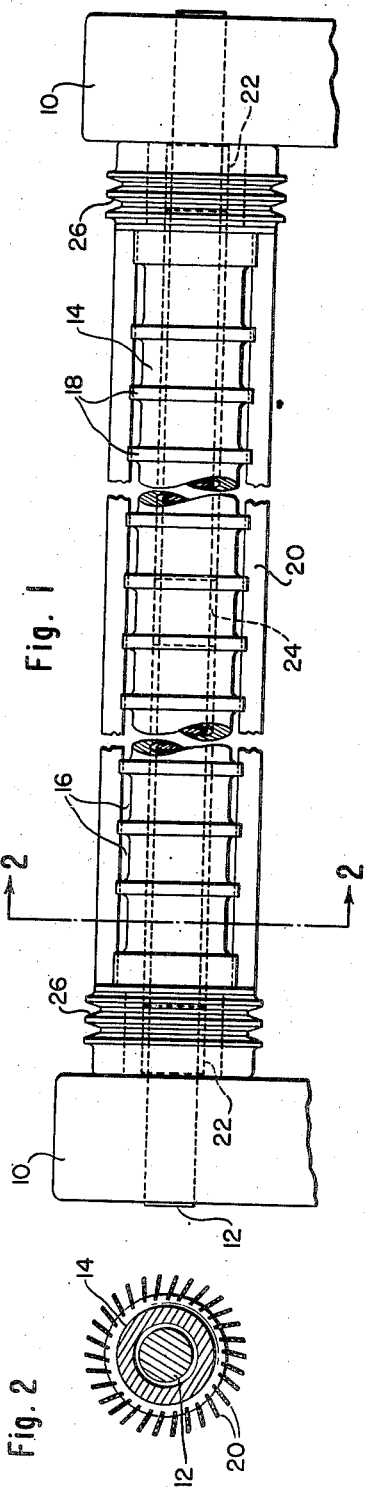
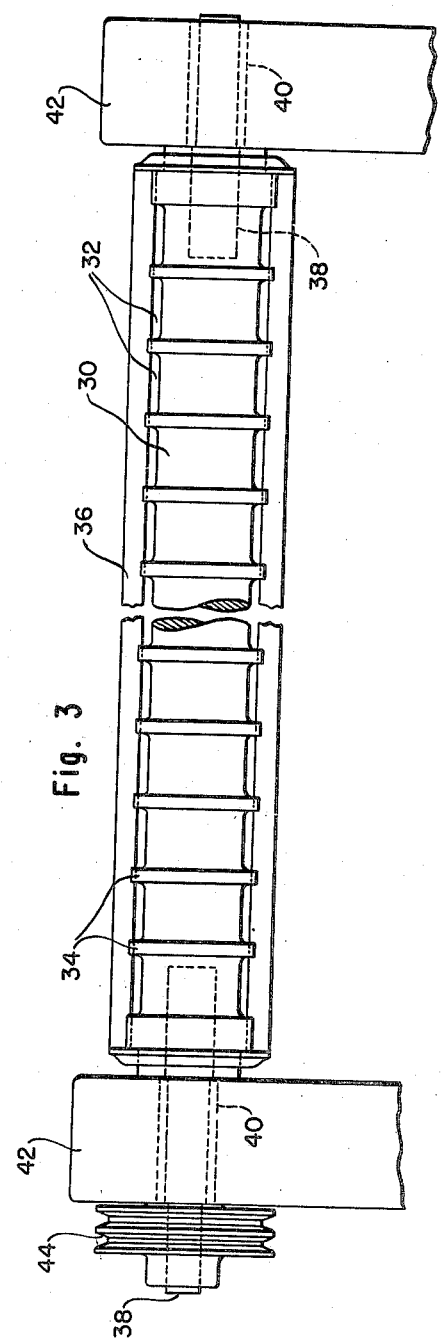
INVENTOR.
CHARLES G. RICHARDSON
BY
Kenway, Jenney, Witter & Hildreth
ATTORNEYS Patented Aug. 12, 1952

2,606,355

UNITED STATES PATENT OFFICE 2,606,355

ROTARY SHEARING MEMBER

Charles G. Richardson, Springfield, Vt., assignor to Parks & Woolson Machine Co., Springfield, Vt., a corporation of Vermont Application March 7, 1951, Serial No. 214,311

6 Claims. (Cl. 26—15)

1

This invention relates to rotary shearing members particularly adapted for use in cloth shearing machines. Relatively wide fabrics are fed through these machines and the shearing members shear the surface threads to a uniform length. The shearing members, being relatively long and supported at their ends, must be of substantial construction and provision must be made for disposing of the loose flock resulting from the shearing operation. The primary object of my invention resides in an improved construction adapted to give superior supporting strength to the shearing member and provide means for removing the flock as it is sheared from the fabric.

These and other features of the invention will be best understood and appreciated from the following description of preferred embodiments thereof selected for purposes of illustration and shown in the accompanying drawing in which:

Fig. 1 is a side elevation of a rotary shearing member embodying my invention,

Fig. 2 is a sectional view taken on line 2—2 of Fig. 1, and

Fig. 3 is a side elevation of a modified construction.

Referring first to Figs. 1 and 2 of the drawing, 10 indicates the two side members of the frame of a cloth shearing machine. A fixed shaft 12 is disposed between the frame members and supported at its ends in the members. My improved rotary shearing member 14 is rotatably mounted on the shaft between the frame members 10.

The shearing member 14 is constructed from a tubular steel bar by grooving the bar annularly at spaced areas 16 therealong to provide a plurality of spaced annular rings 18 integral with the bar and annular channels 16 between the rings. Rings are then slotted to receive shearing blades 20 which are anchored securely within the slots, the slots and blades preferably being disposed helically about the member. The slots are of a depth to give adequate support to the blades and space the blades from the bottoms of the channels 16. A portion of the slots and blades has been omitted from Fig. 1 for the purpose of better illustrating the invention.

The member 14 is mounted on the shaft 12 between the frame members 10 and is supported for rotation on two bearings 22 at the ends of the member 14. Other bearings as indicated at 24 can be provided if desired. The members also carry a driving pulley 26 at one or both ends inside of and adjacent to the frame 10. Thus supporting the driver directly on the member 14

2 inside the frame 10 aids in eliminating vibration and distortion of the member.

The shearing member 30 illustrated in Fig. 3 of the drawing comprises a slotted round bar grooved annularly to form annular channels 32 and annular integral rings 34, like those illustrated in Fig. 1. Shearing blades 36 are mounted in slots in the rings in the manner above described and illustrated in Fig. 2. Two steel gudgeons 38 are rigidly mounted in the ends of the member and project outwardly therefrom to provide shafting for rotatably supporting the member in bearings 40 in the frame members 42. Driving means, as a pulley 44, can be mounted on one or both of the gudgeons either inside or outside of the frame members 42. A portion of the slots and blades has been omitted from Fig. 3 for the purpose of better illustrating the invention.

The shearing machines are constructed to operate on relatively wide fabrics and the shearing cutters are therefore required to be of substantial length. My improved construction is designed to provide this length and give firm support to the blades and shearing unit against deflection and vibration. Constructing the members 14 and 30 from one-piece stock by turning the annular channels 16 and 32 therein not only provides a stronger unit but also one that is more economical to produce. This one-piece construction furthermore eliminates internal stress that would otherwise be present and provides a balanced rotor that can be successfully run at the high speeds required. The blades are spaced from the bottoms of the channels and this chamber construction creates an air suction that removes the flock or fibers as they are sheared and results in more effective shearing of the fabrics.

Having thus disclosed my invention what I claim as new and desire to secure by Letters Patent is:

1. A rotary shearing unit comprising a relatively long member round in cross section and annularly grooved therealong to provide a plurality of spaced annular rings integral therewith and annular channels between the rings, a plurality of shearing blades on and extending longitudinally of the member about its periphery and supported in slots in the rings and in spaced relation from each other and from the bottoms of the channels, shafting extending outwardly from the ends of the member for supporting the member for rotation about the longitudinal axis of the shafting and member, and means for rotating the member.

2. A rotary shearing unit comprising a shaft adapted to be rigidly supported at its two ends, a tubular member on and parallel with the shaft between said ends, spaced bearings rotatably supporting the member on the shaft, a plurality of shearing blades on and extending longitudinally of the member and in spaced relation from each other about its periphery, and an annular driver at one end of the member for rotating it on the shaft.

3. The rotary shearing unit defined in claim 2 plus a plurality of annular rings rigidly carried on and in spaced relation along the member, said shearing blades being supporting in slots in the rings and spaced from the member between the rings.

4. The rotary shearing unit defined in claim 2 in which the member is provided with a plurality of open annular channels therein in spaced relation along the member and providing spaced annular rings integral with the member between the channels, said shearing blades being supported in slots in the rings and spaced from the bottoms of the channels.

5. The rotary shearing unit defined in claim 2 in which the driver is disposed on the member about one of said bearings.

6. The rotary shearing unit defined in claim 1 in which said member is a solid metal bar and said shafting comprises two steel gudgeons rigidly mounted in the ends of the member and projecting outwardly therefrom.

CHARLES G. RICHARDSON.

REFERENCES CITED

The following references are of record in the file of this patent:

UNITED STATES PATENTS

| Number | Name | Date |
|---|---|---|
| 1,832,717 | Marble | Nov. 17, 1931 |